United States Patent
Li et al.

(10) Patent No.: US 8,914,335 B2
(45) Date of Patent: Dec. 16, 2014

(54) PROVISIONING METHOD AND SYSTEM (75) Inventors: Xuejun Li, Shanghai (CN); Howard Wang, Shanghai (CN); Lei Zhu, Shanghai (CN)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 323 days.

(21) Appl. No.: 13/129,922

(22) PCT Filed: Nov. 19, 2008

(86) PCT No.: PCT/CN2008/001888
§ 371 (c)(1),
(2), (4) Date: May 18, 2011

(87) PCT Pub. No.: WO2010/057332
PCT Pub. Date: May 27, 2010

(65) Prior Publication Data
US 2011/0225132 A1 Sep. 15, 2011

(51) Int. Cl.
*G06F 17/00* (2006.01)
*H04L 12/24* (2006.01)

(52) U.S. Cl.
CPC ........ *H04L 41/0863* (2013.01); *H04L 41/0806* (2013.01); *H04L 41/0859* (2013.01)
USPC ............ 707/687; 707/703; 711/181; 711/182

(58) Field of Classification Search
CPC ................... G06F 17/30575; G06F 17/30067; G06F 17/30578; G06F 11/1471; G06F 11/3476
See application file for complete search history.

(56) References Cited

U.S. PATENT DOCUMENTS

| | | | | |
|---|---|---|---|---|
| 5,608,720 A | * | 3/1997 | Biegel et al. | 370/249 |
| 5,920,846 A | * | 7/1999 | Storch et al. | 705/7.14 |
| 6,415,028 B1 | * | 7/2002 | Bauer et al. | 379/221.13 |
| 6,661,888 B2 | * | 12/2003 | Bell et al. | 379/221.13 |
| 6,769,010 B1 | * | 7/2004 | Knapp et al. | 709/203 |
| 6,778,651 B1 | * | 8/2004 | Jost et al. | 379/201.01 |
| 7,330,722 B1 | | 2/2008 | Kirtley et al. | |
| 2005/0010660 A1 | | 1/2005 | Vaught | |
| 2005/0021611 A1 | * | 1/2005 | Knapp et al. | 709/203 |
| 2005/0114223 A1 | * | 5/2005 | Schneider | 705/26 |
| 2006/0288072 A1 | * | 12/2006 | Knapp et al. | 709/203 |

(Continued)

FOREIGN PATENT DOCUMENTS

| | | |
|---|---|---|
| CN | 1335006 A | 2/2002 |
| CN | 1588949 A | 3/2005 |

(Continued)

*Primary Examiner* — Angelica Ruiz
(74) *Attorney, Agent, or Firm* — Coats & Bennett, PLLC (57) ABSTRACT

A method and system of provisioning one or more Network Elements, as well as a method and apparatus for resuming a failed Customer Service Order for provisioning one or more Network Elements, is disclosed. A provisioning logic framework receives a Customer Service Order CSO from a Business Support System, calls respective provisioning logic for performing said Customer Service Order and detects if the received Customer Service Order is a CSO to be resumed. During the performing time of said Customer Service Order, historical processing data is stored. If it is detected that the received Customer Service Order is a CSO to be resumed, the provisioning logic framework builds up a fake environment on the basis of historical processing data stored previously for the CSO to be resumed. Then the successful part of the CSO is directed to the fake environment and the uncompleted part of the CSO is directed to actual Network elements.

23 Claims, 6 Drawing Sheets

(56) References Cited

U.S. PATENT DOCUMENTS

| | | |
|---|---|---|
| 2007/0019561 A1* | 1/2007 | Peterson ........................ 370/252 |
| 2007/0147346 A1* | 6/2007 | Gilmartin ...................... 370/352 |
| 2007/0207800 A1* | 9/2007 | Daley et al. ................... 455/425 |
| 2008/0159506 A1 | 7/2008 | Raheja |
| 2008/0270597 A1* | 10/2008 | Tenenti .......................... 709/224 |
| 2009/0013210 A1* | 1/2009 | McIntosh et al. ................. 714/4 |

FOREIGN PATENT DOCUMENTS

| | | |
|---|---|---|
| CN | 1866875 A | 11/2006 |
| EP | 1865448 A1 | 12/2007 |
| KR | 20010094585 A | 11/2011 |
| WO | 0039960 A1 | 7/2000 |

* cited by examiner

PROVISIONING METHOD AND SYSTEM

TECHNICAL FIELD

The present invention relates to a provisioning method and system, more specifically, to a solution for resuming a failed Customer Service Order for provisioning one or more Network Elements.

BACKGROUND

Provisioning is an important aspect in getting the network ready to serve the end users. It normally involves provisioning of multiple parameters, multiple nodes and the provisioning system needs to keep the data consistent.

A typical provisioning system works like the following:

A CSO (Customer Service Order) is sent from business support systems of the operator to the provisioning system. A CSO normally contains a bunch of parameters that can get one or more NEs (Network Elements) ready to support a certain service and enable the subscriber to use said service. Such a CSO would need to be provisioned into the network, where it might end up with provisioning of multiple NEs (Network Elements), with multiple request/response communications towards each of them.

In such a provisioning sequence it is very important to keep the completeness or consistency of the data, both within the same node or across multiple NEs, since the incompleteness and inconsistency of the data will result in the incapability of implementing the service. These are typical cases:

Part of the subscriber data resides in multiple NEs and they need to be exactly the same, or they are related. These data is either in all places or they should be in some of them.

In case of only one NE is provisioned, there might be multiple requests sent and each with part of the data. The business support systems would like to have the whole CSO completed.

The traditional solutions for the completeness/consistency problem include:

Retrying by storing the uncompleted commands, i.e. the uncompleted part of the CSO. If a command fails in the middle, typically due to the NE is not available because of e.g. link failure, the command that failed together with all the ones following that will be stored in a queue to be executed later.

Rollback previous commands. The commands that have been successfully executed which impacts the consistency of the subscriber data will be rolled back, to remove inconsistency.

However, said existing solutions are both problematic. A CSO might end up with multiple commands towards one or more NEs. The generation of the commands might be dependent on the status of NE itself. For example you need to do a "Read" command to read the status of the NE from the NE before you know how to generate and execute the next "Modify" command. This means that the generation very often needs to be done by some logic/code dynamically not static.

Then for the retrying approach above by storing the not executed commands, it would need to predict for the commands that are left upon the failure. This is very often not possible to be done successfully, especially in scenarios with a complex logic or when interactions (e.g. read) with NE is mandatory.

Rollback tries to solve the inconsistency immediately, compared with retry approach by trying to fix it later, by undoing what has been successfully done and reverting to the previous state. The problems with this one is the rollback scenarios might be many, especially for a complex logic, and rollback can fail too probably where the CSO has just failed, then you will get stuck. For example, if a "create subscriber" command fails and the subsequent rollback also fails in the middle, then you can't move forward by either trying to create again (because part of it already exists and creating a new one with the existing part remaining will result in inconsistence) or delete (because part of it has not been created yet, the delete won't succeed).

SUMMARY

It is the object of the present invention to solve at least some of the above problem and provide a new mechanism to solve the data consistency issues via resuming the previously failed provisioning attempt.

According to one aspect of the present invention, there is provided a method of provisioning one or more Network Elements. Said provisioning method comprise steps of receiving a Customer Service Order CSO from a Business Support System and calling respective provisioning logic for performing said Customer Service Order. The method further comprises the step of detecting if the received Customer Service Order is a Customer Service Order to be resumed or not. If it is detected that the received Customer Service Order is a Customer Service Order to be resumed, the provisioning method further comprises steps of: directing the successful part of the Customer Service Order to a fake environment which is based on historical processing data stored for the Customer Service Order, and directing the uncompleted part of the Customer Service Order to actual Network elements.

Preferably, the historical processing data is stored as log data.

Preferably, said provisioning method further comprising the step of generating at least one provisioning command from the received CSO and executing said at least one provisioning command.

Preferably, the successful part of the CSO comprises the successfully executed provisioning commands.

Preferably, the historical processing data comprises the successfully executed provisioning commands and corresponding responses.

Preferably, the step of directing the successful part of the CSO to the fake environment comprising the steps of retrieving the stored response corresponding with the command that was previously successfully executed and forwarding the retrieved response to the provisioning logic.

Preferably, the provisioning method further comprises the step of storing the Customer Service Order.

Preferably, the provisioning method further comprises: if the Customer Service Order is performed successfully, marking the Customer Service Order as completed, otherwise, marking the Customer Service Order as failed.

Preferably, the provisioning method further comprises the step of automatically resuming/retrying the CSO marked as failed.

According to another aspect of the present invention, there is provided a method of resuming a failed Customer Service Order CSO for provisioning one or more Network Elements. Said resuming method comprises steps of calling a provisioning logic for performing said Customer Service Order, directing the successful part of the Customer Service Order to a fake environment which is based on historical processing data of said Customer Service Order, and directing the uncompleted part of the Customer Service Order to actual Network elements.

According to yet another aspect of the present invention, there is provided an apparatus for resuming a failed Customer Service Order CSO for provisioning one or more Network Elements. The resuming apparatus comprises means for calling a provisioning logic for performing said Customer Service Order, means for directing the successful part of the Customer Service Order to a fake environment which is based on historical processing data of said Customer Service Order and means for directing the uncompleted part of the Customer Service Order to actual Network elements.

According to still another aspect of the present invention, there is provided a provisioning system. The provisioning system comprises a provisioning logic framework adapted to host at least one provisioning logic, the provisioning logic framework is operable to receive Customer Service Order CSO from a Business Support System, communicate with one or more Network Elements NEs and detect whether the received CSO is a CSO to be resumed; and a memory for storing the historical processing data regarding said Customer Service Order. The provisioning system further comprises the resuming apparatus as defined above for resuming a Customer Service Order detected to be resumed.

According to still another aspect of the present invention, there is provided a computer program product. The computer program product comprises program instructions, when loaded by a computer machine, operable to cause the computer machine to perform the provisioning or resuming method as described above.

By means of the above technical solutions, the present invention overcomes the problems in the prior art resuming solution. The traditional approaches of handling the consistencies (retry by queuing and rollback described above) need to make the provisioning logic aware of all scenarios that could cause consistencies. This might grow quite complicated for solutions with complex subscriber data relations. And the solution is specific for each NE provisioning solution built (e.g. IMS, core network, messaging). With the solution according to the present invention, one can get a generic framework and free the provisioning logic from such consistency issues, so that it can be simplified and focus on the normal provisioning flow.

In this way, the designer of the provisioning logic need not consider the generic issues such as consistency issues. Therefore, the design of the provisioning is significantly simplified and the corresponding design cost is also decreased significantly. At the same time, the present invention provides the possibility of configuring different provisioning logics in one provisioning logic framework or platform as desired. The present invention can add/remove freely a provisioning logic into/from the provisioning system and hence decreases the total deploying cost of the provisioning system.

Therefore, the present invention brings decreased development cost significantly for each specific provisioning solution. At the same time, the invention is more robust against the failure of the CSO, hence the subscriber data in the operator's network is kept more consistent, getting rid of a lot of troubles for the operator brought by data inconsistencies.

BRIEF DESCRIPTION OF THE DRAWINGS

The invention will now be discussed in more detail with reference to the accompanying drawings, in which.

Throughout the figures, same reference numerals indicate similar or corresponding features. Some of the features indicated in the drawings are typically implemented in software, and as such represent software entities, such as software modules or objects. But the invention is not limited thereto. Said features can also be implemented in hardware, firmware or any combination of software, hardware and firmware.

DETAILED DESCRIPTION

The inventor recognizes that the provisioning system can be divided into 2 layers, a general provisioning logic framework and provisioning logic. The provisioning logic framework hosts the provisioning logic and provides a common environment or platform for provisioning logic execution.

The inventor also recognizes that various tasks the provisioning system takes on can be divided and be partaken of by the provisioning logic framework and the provisioning logic, respectively. The provisioning logic framework can take on the general transactions common to various provisioning logics so that the provisioning logics need not consider the general transactions which will complicate the design and can be dedicated to the specific provisioning tasks.

The aforementioned general transactions include, among other things, to keep the completeness or consistency of data and resume from failure. One or more embodiments herein address the completeness/consistency problem by building up a "fake" environment for the provisioning logic. This fake environment may be built, for example, by using the historical processing data. Historical processing data may include, for example processing log which has been stored for the previous failed CSO. In the "fake" environment, transactions for resuming from the failure are processed by the provisioning logic framework and are kept transparent to the provisioning logic. In this way the provisioning logic does not need to be aware of the failure, it just does the normal provisioning flow as if no failure occurs. That is, the failure recovery mechanism may be omitted from the provisioning logic. The provisioning of that CSO can be resumed by the provisioning logic framework using the aforementioned fake environment.

Figure 1:
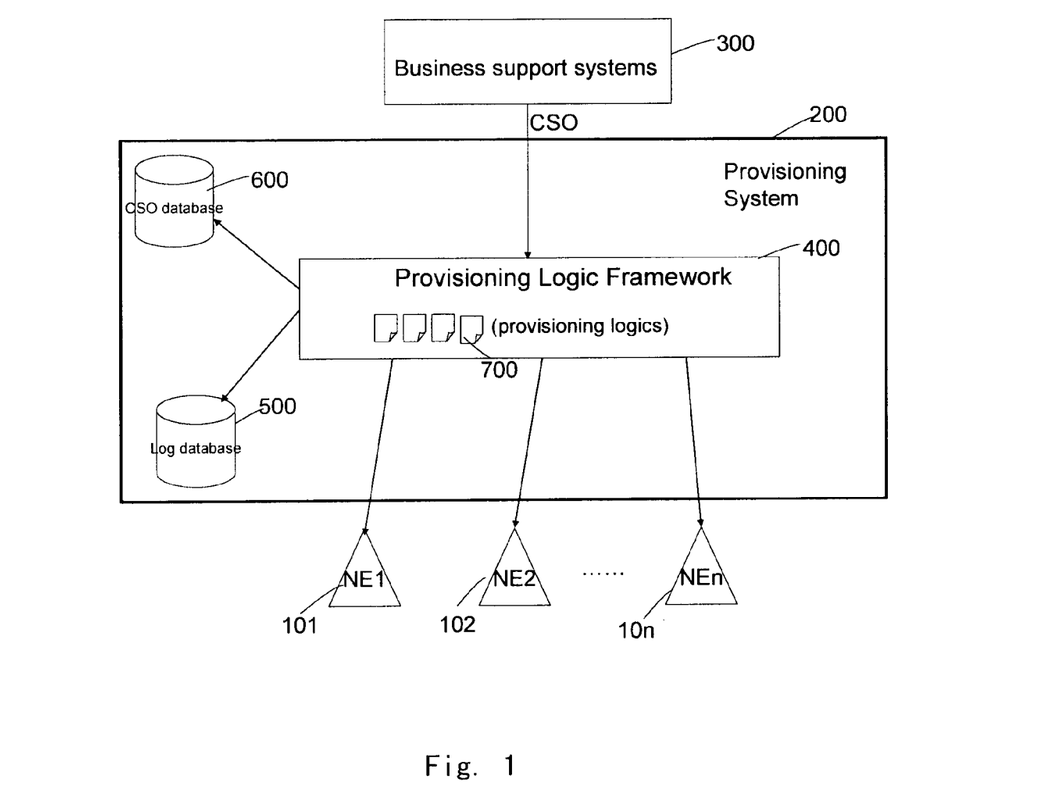
FIG. 1 schematically illustrates a block diagram of the provisioning system according to one embodiment of the present invention.

FIG. 1 schematically illustrates a block diagram of the provisioning system 200 according to one embodiment of the present invention. As illustrated in FIG. 1, the provisioning system 200 is coupled to a Business support system 300 and one or more Network Elements, NE1-NEn, 101-10n. Said Business support system 300 is a dedicated system for managing and configuring the services supported in the network and said Network Elements NE1-NEn refer to all devices or system in the network that are needed for providing a certain service to the end users. That is, said Network Elements NE1-NEn represent all necessary units for supporting the service. It is noted that said coupling can be wired or wireless. Said coupling can also be direct coupling or indirect coupling in which there is at least one intermediate node. The present invention applies to various coupling and it is not intended to limit the present invention in this respect.

The provisioning system 200 comprises a provisioning logic framework 400 adapted for hosting various provisioning logics 700, a log database 500 for storing historical processing data regarding the CSO execution and a CSO database 600 for storing the received CSO.

The provisioning logic framework 400 hosts the provisioning logic 700 and can create a "fake" environment for the provisioning logic 700 in order to resume previously failed provisioning At the beginning of the provisioning process according to the present invention, the provisioning system 200 (or the provisioning logic framework 400) receives Customer Service Order CSO from the Business support system 300 and provisions said one or more Network Elements, NE1-NEn, 101-10n with the received CSO. Therefore, the provisioning system 200 (or the provisioning logic framework 400) comprises communicating means (not shown) for communicating with the Business support system 300 and one or more Network Elements, NE1-NEn, 101-10n on behalf of provisioning logic 700. Then the provisioning logic framework 400 calls hosted corresponding provisioning logic for performing said received CSO and detects whether the received CSO is a CSO to be resumed. The called provisioning logic 700 generates one or more commands based on the received CSO. The provisioning Logic Framework 400 records all the commands and response in the log database 500 along with the relevant parameters and the execution status of each command. Note that it is also feasible to store the historical processing data in other storage media. But it is advantageous to use the log database 500 storing the logging data in the provisioning system 200 since the existing provisioning system often has such function and such implementation will bring less alternation to the existing provisioning system. The CSO database 600 stores the orders from Business support systems 300. This is needed if the business support systems 300 don't want to send the CSO again, then the provisioning system can retrieve it and automatically resume/retry it intermediately after the CSO fails.

If it is detected that the received CSO is a CSO to be resumed, the provisioning logic framework 400 will build up a fake environment for executing the previously successfully executed commands of said CSO. Otherwise, no fake environment will be built up. In both case, the provisioning logic 700 executes the generated commands in the same manner and always considers the generated commands to be generated from a new CSO, without being aware of any failure. In the fake environment, the provisioning logic framework 400 retrieving historical processing data from the log database to get all information about the successful executed command, including request for execution of the command, relevant parameters, response to the command and the like. With all these historical processing data, the provisioning logic framework 400 receives request from the provisioning logic 700 and ignores the request, forwards the retrieved response, perhaps along with necessary parameters or status, to the provisioning logic 700. The reason why the actual Network Elements, NE1-NEn, 100-10n can be excluded from this process is that this process has been previously executed successfully by the actual Network Elements, NE1-NEn, 100-10n and need not be performed once again. For the provisioning logic 700, the provisioning logic framework 400 pretends to be the actual Network Elements, NE1-NEn, 100-10n and interacts with the provisioning logic 700.

The important point is the provisioning logic 700 is not impacted and even not aware of the resumed provisioning solution. It is the provisioning logic framework 400 that supports the fake environment. According to one embodiment of the present invention, the provisioning logic framework 400 comprises various modules responsible for various functions that are common to a plurality of provisioning logic and can be implemented in the provisioning logic framework 400. For example, the provisioning logic framework 400 may comprise a resuming apparatus dedicated to the resuming issues.

Although the log database 500 and the CSO database 600 are illustrated as two separate databases, they can be comprised in one single database or distributed across a plurality of databases when needed. Although the term "database" is used herein, it can be implemented by all kinds of storage media which can be used to store the desired information and which can accessed by a computer, including, but not limited to, volatile and non-volatile, removable and non-removable media implemented in any method or technology.

Below, the sequence of operations and steps will be described with reference to FIG. 2-6 in detail.

Figure 2:
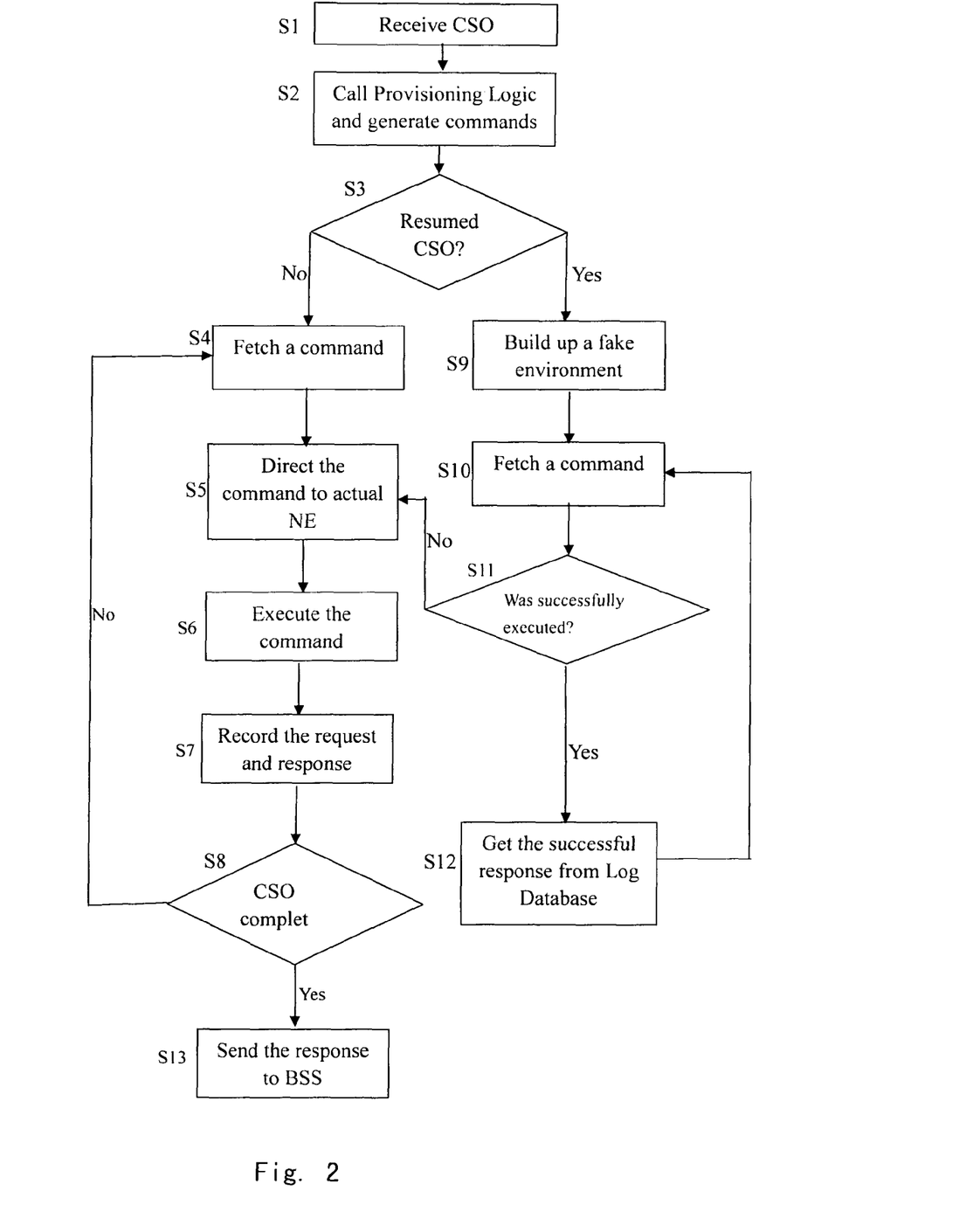
FIG. 2 schematically illustrates a flow diagram of the provisioning method according to one embodiment of the present invention.

FIG. 2 schematically illustrates a flow diagram of the provisioning method according to the present invention. The provisioning method starts at step S1, where a CSO is received by the provisioning system 200 from the Business support system 300, and is passed to the provisioning logic framework 400. Alternatively, the CSO is received directly by the provisioning logic framework 400 itself. Preferably, the CSO is stored in the CSO database 600 during step S1. Then at step S2, the provisioning logic framework 400 calls corresponding provisioning logic 700 for performing said received CSO and the called provisioning logic 700 generates a few provisioning commands based on the received CSO. At step S3, the provisioning logic framework 400 detects whether the received CSO is a CSO to be resumed. This should have been marked in the CSO. If the received CSO is not a CSO to be resumed, then the process proceeds to step S4, where the provisioning logic framework 400 fetches a command from the previously generated commands. Then at step S5, the provisioning logic framework 400 directs request and relevant parameters (if any) regarding the fetched command to actual Network Elements, NE1-NEn, 100-10n, i.e. requesting NE1-NEn 100-10n to execute the fetched command and to return a corresponding response. At step S6, the actual Network Elements, NE1-NEn, 100-10n execute the fetched command and return the corresponding response to the provisioning system 200. Then at Step S7, the request including executed command and relevant parameters are stored in the log database 500 along with the corresponding response. After step. S7, the process proceeds to step S8, where it is determined if the CSO is completely performed. That is, it is determined whether all commands of the CSO have been executed. If the answer is "YES", it means that all commands of the CSO have been executed and the process proceeds to step S13 where the response is sent to the Business Support System 300 and the provisioning method ends. However, if it is determined, at step S8, that there are still commands remaining unexecuted, the process returns to step S4 at which a next command is fetched and the procedure proceeds in the similar way as above.

If, at step S3, the received CSO is detected to be a CSO to be resumed, the process proceeds to step S9. At step S9, the provisioning logic framework 400 builds up a fake environment for executing the generated commands. Then at step S10, the provisioning logic framework 400 fetches a command from the previously generated commands. Then at step S11, it is determined whether the fetched command of the resumed CSO was previously executed successfully. This can be done by checking the log database 500. If it has been executed successfully, then at step S12, the provisioning logic framework 400 directs the request to the fake environment built up. More specifically, the provisioning logic framework 400 receives the request from the provisioning logic 700 being executed and retrieve the corresponding response from the log database 500, perhaps along with relevant parameters or status information required by the provisioning logic 700. Then the response is forwarded to the provisioning logic 700. That is, the provisioning logic framework 400 or the fake environment built up thereby pretends to be the actual Network Element and return the response required by the provisioning logic 700. In this way, execution of said command is completed as usual in the view of the provisioning logic 700. Then the process returns to step S10 to fetch and execute the next command of the resumed CSO as above. If, at step S11, it is determined that the command has previously failed, then the process proceeds to step S5, where the provisioning logic framework 400 directs the fetched command to actual Network Elements, NE1-NEn, 100-10*n*. Then the process continues as described above until all commands of the resumed CSO are executed successfully. If all commands of the resumed CSO have been executed, the process proceeds to step S13, where a response is sent to the Business Support System 300 and the resumed provisioning method ends.

Note that even the above the provisioning method might fail due to any kind of failure. If the provisioning method fails at any one of steps S1-S13, the method ends at once and report errors to the provisioning system. Then in order to resume the provisioning, one need only restart the above provisioning method according to the present invention.

Such a solution does not really care what is implemented inside provisioning logic, it can even be doing rollback. Then the resumed provisioning will continue whatever it was doing: rollback for example.

Note that the order of method steps is not necessarily as above. Those skilled in the art appreciate that the above order can be changed as desired, unless otherwise specifically indicated. For example, the detection step may be performed before the step of calling provisioning logic. In addition, the operation of generating provisioning commands sometimes will be performed in step S4 since the generation of certain commands relies on the result of the previous commands. More generally, the operation of provisioning logic 700 can be distributed differently from the above since the present invention does not really care what is implemented inside provisioning logic and the above flow diagram is illustrated and described in the perspective of the provisioning logic framework 400.

Figure 3:
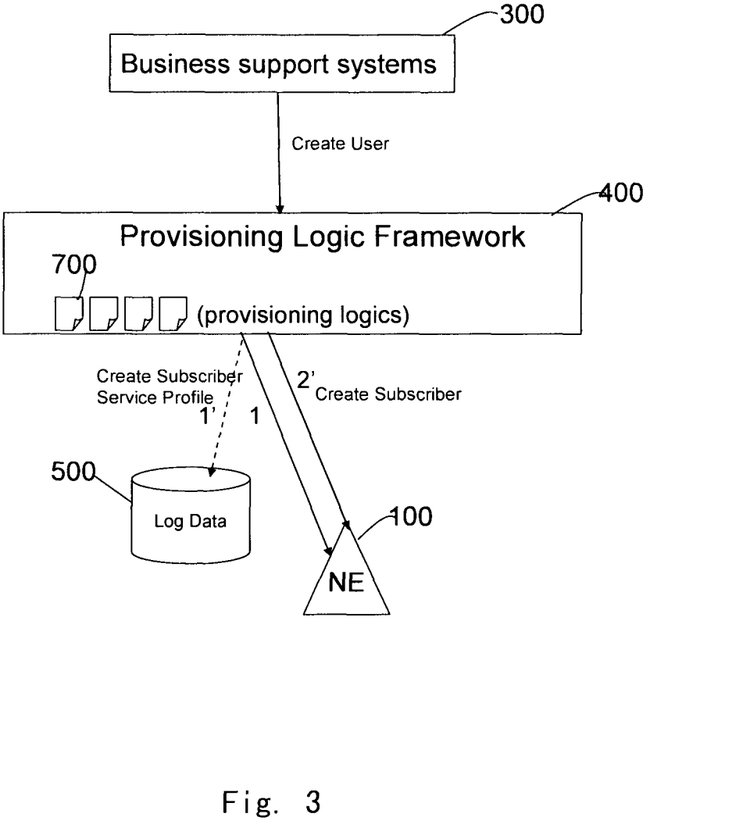
FIG. 3 shows the illustration of provisioning one Network Element with several commands according to one embodiment of the invention.

FIG. 3 shows a typical application scenario of the invention, in which one NE is provisioned with several commands. In this scenario, the provisioning logic 700 generates a few provisioning commands to one Network Element 100. There can be inconsistency for the Network Element 100 if one or several commands executed successfully but the left ones are not executed due to failure.

As illustrated in FIG. 3, the provisioning system receives one Create User CSO from Business Support System 300. In an alternative embodiment, the CSO may have been stored in the provisioning system 200, i.e. in the CSO database 600, and does not need receiving from the Business Support System 300. In order to create the user on the Network Element 100, at least one command need to be generated from the CSO. For example, two commands are generated, i.e. one command 1 for creating a Subscriber Service Profile for the User and another for creating the Subscriber which will refer to the service profile. If the first command succeeds but the second one fails, data inconsistency will exist in the Network Element 100 as the Subscriber Service Profile is created for the subscriber not existed in the system.

With the provisioning resuming solution according to the present invention, the Provisioning Logic Framework 400 will retry the Create User CSO, automatically (requiring that the failed CSO is stored in the provisioning system 200 along with corresponding historical processing data) or after receiving again the CSO and detecting that it is to be resumed, the provisioning logic runs as normal without knowing that it has been run for the same CSO as before. When the first Create Subscriber Service Profile command 1' is generated by the provisioning logic 700, the Provisioning Logic Framework 400 detects that this command 1' belongs to a "resumed" CSO, and will check the log database 500 to see if the command has already been successfully executed. In this is case, it is yes, then the Provisioning Logic Framework 400 will get the response in the historical processing data from the log database 500 and forward it to the provisioning logic 700. The provisioning logic 700 gets the response and continues processing without knowing the Create Subscriber Service Profile command is not really executed at all. Then the second command Create Subscriber 2' is generated, the Provisioning Logic Framework 400 again detects that this command 2' belongs to a "resumed CSO" and checks the log database 500 to see if the command has already been successfully executed. This time the command 2' was failed, so the Provisioning Logic Framework 400 will direct it to the NE. Then the Create Subscriber command 2' will be executed in the Network Element 100 and the Subscriber will be created. This time, the Subscriber is created successfully in the Network Element 100 and hence the user is successfully created with the created Subscriber referring to the created Subscriber Service Profile. That is, the CSO is performed completely and the provisioning method is resumed successfully.

The above CSO is just an example for purpose of illustration. Other kinds of CSOs are also possible. The number of commands generated from the CSO is not limited to two, it may be one, three, four, five or more. The present invention can be applied regardless of the number.

Figure 4:
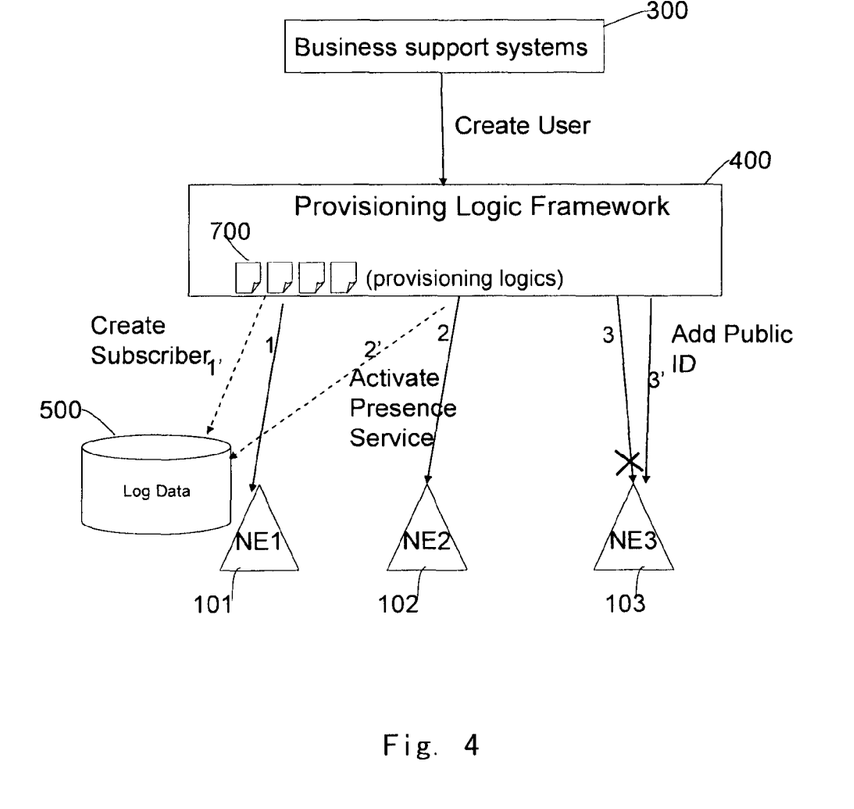
FIG. 4 shows the illustration of provisioning across multiple Network Elements according to one embodiment of the invention.

FIG. 4 shows another typical application scenario of the invention, in which the present invention provisions across multiple Network Elements. This is the most typical use of the resumed provisioning solution according to the present invention. As illustrated in FIG. 4 as an example, Business support system 300 sends a Create User CSO to Provisioning System 200. In order to complete the provisioning, in this example, three Network Elements, NE1-NE3, 100-103 will be involved in three steps:

Step 1: Create the User as a Subscriber in NE1 100
Step 2: Activate the presence service for User in NE2 102
Step 3: Add the telephone public Id of the User into NE3 103 in order to make the user to be accessed via telephone In the example illustrated in FIG. 4, the first two steps are successfully executed and the third step fails perhaps due to the failure of NE3 103. Therefore, all commands and responses in the first two steps have been stored in the log database 500. When the CSO is retried, all previous successful commands to NE1 and NE2 will be "intercepted" by the Provisioning Logic Framework 400 in the same way as above. The historical processing data stored in the log database 500 is also used to give the provisioning logic 700 a fake response 1', 2'. This will make sure provisioning logic 700 does not need to be modified and still continue as if it is executing a new CSO rather than a resumed one.

When it comes to the point where it failed in previous execution, i.e. in the third step 3, it continues as normal since the commands 3' in this stage are directed to the actual Network Element NE3 103. In this way, the CSO is performed completely and the provisioning method is resumed successfully.

In another application scenario, the present invention handles rollback failure. In order to ensure data consistency, some of provisioning logics themselves support rollback when there is provisioning failure. According to one embodiment of the present invention, the Provisioning Logic Framework 400 can handle scenarios where such a rollback procedure fails and resume the rollback procedure in a similar way as for a normal provisioning procedure. In this way, the rollback procedure can continue from wherever it fails. By completing the rollback, it removes the potential inconsistencies and reverts the network state to the original one.

Figure 5:
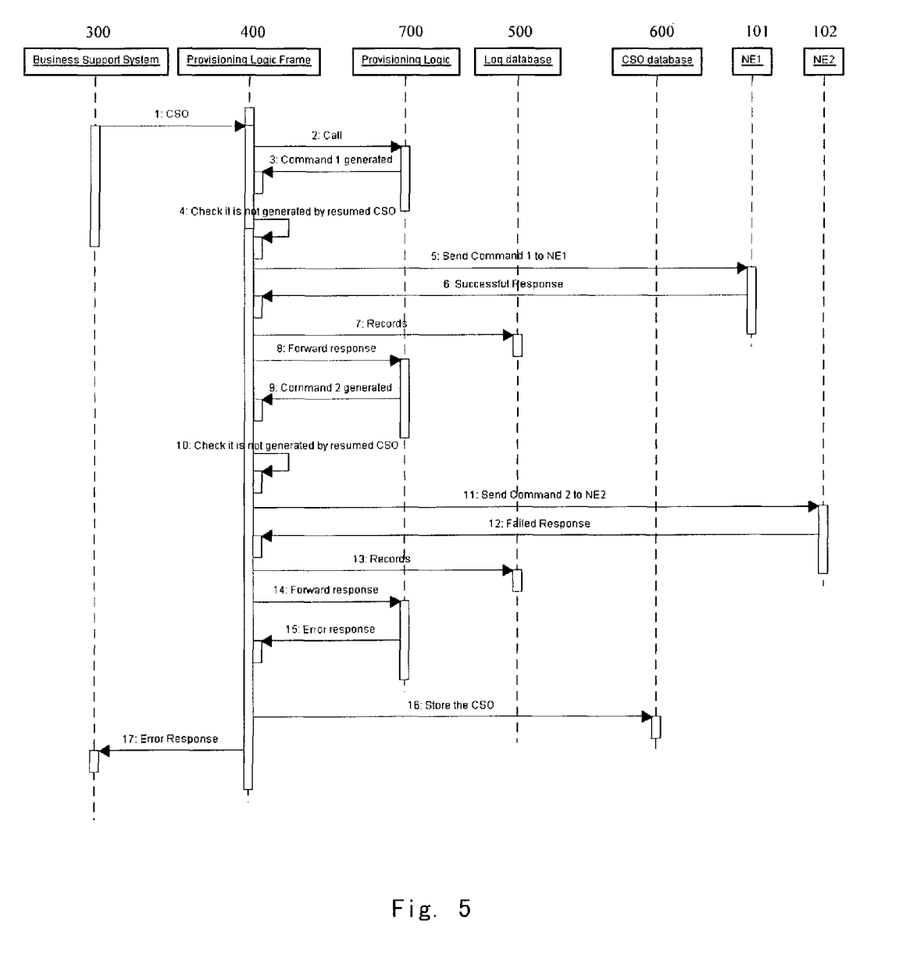
FIG. 5 shows the sequence diagram of the normal provisioning method, in which there is failure occurring and the CSO is performed unsuccessfully.
Figure 6:
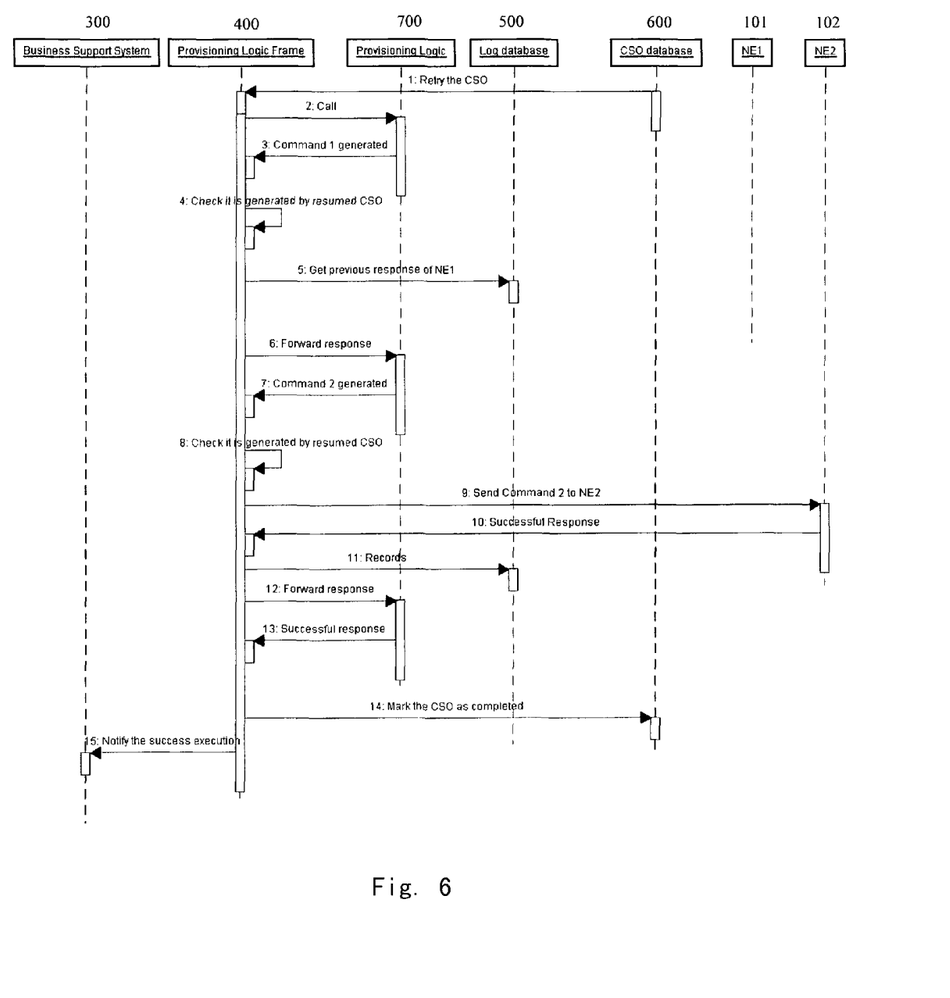
FIG. 6 shows the sequence diagram of the method of retrying the failed CSO of FIG. 5 and resuming the provisioning according to one embodiment of the invention.

FIG. 5 and FIG. 6 illustrate the more specific sequence of a typical scenario for provisioning across multiple Network Elements. Due to the big amount of steps, it is grouped into 2 big steps. The first step describes the normal provisioning, which is illustrated in FIG. 5. The second one describes the retry CSO and resume provisioning, which is illustrated in FIG. 6. For the purpose of simplifying the illustration and explanation, there are only two Network Elements NE1-NE2 101-102 illustrated in the figures. But the present invention is not limited to it. From the teaching of the present disclosure, those skilled in the art can easily extend the two Network Elements to more Network Elements without involving any inventive efforts.

FIG. 5 shows the sequence diagram of the normal provisioning method, in which there is failure occurring and the CSO is performed unsuccessfully. From FIG. 5, we can obviously see the timing sequence of the provisioning method. The provisioning method works as follows:

1. Business Support System 300 sends out a CSO for provisioning.
2. Provisioning Logic Framework 400 receives the CSO and calls the corresponding provisioning logic 700.
3. The provisioning logic 700 generates a command and send the command to the Provisioning Logic Framework 400 to execute on NE1 100.
4. The Provisioning Logic Framework 400 detects the command and determines that it is not generated from a "resumed" CSO. Alternatively, the detection may have already been done on the received CSO.
5. The Provisioning Logic Framework 400 sends the command to NE1 100.
6. The NE1 100 executes the command and returns a successful response to the Provisioning Logic Framework 400.
7. The Provisioning Logic Framework 400 records the command and response to log database 500 as historical processing data.
8. The Provisioning Logic Framework 400 forwards the response to the Provisioning Logic 700.
9. The Provisioning Logic 700 gets successful response from NE1 and continues processing to generate the second command to NE2 102.
10. The Provisioning Logic Framework 400 detects the command and determines that it is not generated by a "resumed" CSO.
11. The Provisioning Logic Framework 400 sends the command to NE2 102.

12. The NE2 102 executes the received command. This time the NE2 102 fails to execute the command and returns a failed response.
13. The Provisioning Logic Framework 400 records the command and response to log database 500 as historical processing data.
14. The Provisioning Logic Framework 400 forwards the response to the Provisioning Logic 700.
15. The Provisioning Logic 700 gets the failed response from NE2 102 and aborts the processing and generates an error response.
16. The Provisioning Logic Framework 400 detects the error response, and stores the failed CSO into the CSO database 600. This step is needed if the Business support system 300 does not resend the CSO.
17. The Provisioning Logic Framework 400 informs the Business Support System 300 about the error.

FIG. 6 shows the sequence diagram of the method of retrying the failed CSO of FIG. 5 and resuming the provisioning according to one embodiment of the invention. The resuming procedure is as follow:

1. Either Business Support System 300 resends the CSO or after a certain period (configurable) the Provisioning Logic Framework 400 gets the failed CSO from CSO database 600.
2. The Provisioning Logic Framework 400 calls again the corresponding provisioning logic 700 and re-sends the CSO to the provisioning logic 700 with the CSO marked a "resumed" flag.
3. The provisioning logic 700 will start normal processing without knowing that this CSO has been processed before and generate the first command to NE1 100.
4. The Provisioning Logic Framework 400 detects that this is a resumed CSO and checks the log database 500 to see if the command has been successfully executed or not. In this case, the answer is "yes".
5. Since the command was successfully executed, the Provisioning Logic Framework 400 will check the log database 500 for the previous responses from NE1 100. No command will be actually sent to NE1 100.
6. The Provisioning Logic Framework 400 forwards the response to the Provisioning Logic 700.
7. The provisioning logic 700 gets the response without knowing that the response is from the log database 500 and continues the processing. The second command is generated to provisioning NE2 102.
8. The Provisioning Logic Framework 400 detects that this is a resumed CSO and checks the log database 500 to see if the command has been successfully executed or not. In this case, the answer is "no".
9. Since the command was not successfully executed, the Provisioning Logic Framework 400 will send actually the command to NE2 102 to execute again.
10. The NE2 102 executes the command and returns a successful response.
11. The Provisioning Logic Framework 400 records the command and response to the log database 500 as historical processing data.
12. The Provisioning Logic Framework 400 forwards the response to the Provisioning Logic 700.
13. The provisioning logic 700 gets the successful response from the NE2 102 and completes the processing for the NE2 102.
14. The Provisioning Logic Framework 400 detects the successful response and marks the CSO as completed in CSO database 600.
15. A notification of successful execution is sent to the Business Support System 300. This step is optional.

Above, the invention is described in connection with the specific embodiments of the invention. It should be noted that the above-mentioned embodiments illustrate rather than limit the invention, and that those skilled in the art will be able to design many alternative embodiments without departing from the scope of the appended claims.

In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. The invention can be implemented by means of hardware comprising several distinct elements, and by means of a suitably programmed computer.

In device or system claims enumerating several means, some or all of these means can be embodied by one and the same item of hardware. The mere fact that certain measures are recited in mutually different dependent claims does not indicate that a combination of these measures cannot be used to advantage.

The invention claimed is:

1. A method of provisioning one or more Network Elements, comprising:
   receiving a Customer Service Order (CSO) from a Business Support System, the CSO comprising:
      a successfully completed part corresponding to commands successfully completed during a previous execution of the CSO, the previous execution of the CSO causing generation of historical processing data;
      an uncompleted part corresponding to commands not successfully completed during the previous execution of the CSO;
   calling respective provisioning logic for performing the CSO;
   in response to detecting that the performance of the CSO is to be resumed from the previous execution of the CSO, re-executing the CSO by:
      directing the successfully completed part of the CSO to a fake environment in which the commands successfully completed during the previous execution of the CSO are fulfilled by retrieving the historical processing data; and
      directing commands corresponding to the uncompleted part of the CSO to actual Network Elements.

2. The method of claim 1, wherein the historical processing data is stored as log data.

3. The method of claim 1, further comprising:
   generating at least one provisioning command from said CSO; and
   executing the at least one provisioning command.

4. The method of claim 3, wherein the successfully completed part of the CSO comprises one or more successfully executed provisioning commands.

5. The method of claim 4, wherein the historical processing data comprises one or more successfully executed provisioning commands and corresponding responses.

6. The method of claim 5, wherein directing the successfully completed part of the CSO to the fake environment comprises:
   retrieving a stored response corresponding to a command that was previously successfully executed; and
   forwarding the retrieved response to the respective provisioning logic.

7. The method of claim 1, wherein the fake environment is built up by a provisioning system framework configured to host various provisioning logics.

8. The method of claim 1, wherein the fake environment is configured to pretend to be the actual Network Elements to be provisioned based on the stored historical processing data.

9. The method of claim 1, further comprising storing the CSO.

10. The method of claim 9, further comprising:
    if the CSO is performed successfully, marking the CSO as completed; and
    otherwise, marking the CSO as failed.

11. The method of claim 10, further comprising automatically resuming a CSO marked as failed.

12. A method of resuming a failed Customer Service Order (CSO) for provisioning one or more Network Elements, comprising:
    calling a provisioning logic to re-execute the failed CSO, the failed CSO comprising:
       a successfully completed part corresponding to commands successfully completed during a previous execution of the failed CSO, the previous execution of the failed CSO causing generation of historical processing data;
       an uncompleted part corresponding to commands not successfully completed during the previous execution of the failed CSO;
    directing the successfully completed part of the failed CSO to a fake environment in which the commands successfully completed during the previous execution of the failed CSO are fulfilled by retrieving the historical processing data; and
    directing commands corresponding to the uncompleted part of the failed CSO to actual Network Elements.

13. The method of claim 12, further comprising retrieving the historical processing data from a log database.

14. An apparatus configured to resume a failed Customer Service Order (CSO) for provisioning one or more Network Elements, the failed CSO comprising a successfully completed part and an uncompleted part, the successfully completed part corresponding to commands successfully completed during a previous execution of the failed CSO, the uncompleted part corresponding to commands not successfully completed during the previous execution of the failed CSO, the previous execution of the CSO causing generation of historical processing data, the apparatus comprising:
    a memory for storing the historical processing data;
    one or more processing circuits configured to function as a provisioning logic framework, the provisioning logic framework configured to call a provisioning logic in order to re-execute the failed CSO by:
       directing the successfully completed part of the failed CSO to a fake environment in which the commands successfully completed during the previous execution of the failed CSO are fulfilled by retrieving the historical processing data; and
       directing commands corresponding to an uncompleted part of the failed CSO to actual Network Elements.

15. The apparatus of claim 14, wherein the one or more processing circuits are further configured to retrieve said historical processing data from a log database.

16. The apparatus of claim 14, wherein the one or more processing circuits are further configured to:
    generate at least one provisioning command from the failed CSO; and
    execute said at least one provisioning command via said provisioning logic.

17. The apparatus of claim 16:
wherein the historical processing data comprises successfully executed provisioning commands and corresponding responses; and
wherein the one or more processing circuits are further configured to direct the successfully completed part of the failed CSO to the fake environment by:
retrieving a stored response corresponding with a command that was previously successfully executed; and
forwarding the retrieved response to the provisioning logic.

18. A provisioning system, comprising:
a memory for storing historical processing data stored from a previous execution of one or more Customer Service Orders (CSOs), at least one of the one or more CSOs being a failed CSO comprising:
a successfully completed part corresponding to commands successfully completed during a previous execution of the failed CSO;
an uncompleted part corresponding to commands not successfully completed during the previous execution of the failed CSO; and
one or more processing circuits configured to function as a provisioning logic framework that:
hosts at least one provisioning logic;
communicates with one or more Network Elements; and
is configured to resume the failed CSO for provisioning the one or more Network Elements by calling a provisioning logic to re-execute the failed CSO, in which:
the successfully completed part of the failed CSO is directed to a fake environment in which the commands successfully completed during the previous execution of the failed CSO are fulfilled by retrieving the historical processing data; and
commands corresponding to an uncompleted part of the failed CSO are directed to actual Network elements.

19. The provisioning system of claim 18, further comprising CSO storage for storing CSOs received from a Business Support System.

20. The provisioning system of claim 19, wherein the provisioning logic framework is further configured to mark a CSO as completed if that CSO is performed successfully and, otherwise, to mark the CSO as failed.

21. The provisioning system of claim 20, wherein the provisioning logic framework is further configured to automatically resume a CSO marked as failed.

22. A computer program product stored on a non-transitory computer readable medium and comprising program instructions that, when executed by one or more processing circuits associated with a provisioning system, cause the provisioning system to provision one or more Network Elements, the computer program instructions causing the provisioning system to:
call respective provisioning logic for performing a Customer Service Order (CSO) received from a Business Support System, the CSO comprising:
a successfully completed part corresponding to commands successfully completed during a previous execution of the CSO, the previous execution of the CSO causing generation of historical processing data;
an uncompleted part corresponding to commands not successfully completed during the previous execution of the CSO;
in response to detecting that the performance of the CSO is to be resumed from the previous execution of the CSO, re-executing the CSO by:
directing the successfully completed part of the CSO to a fake environment in which the commands successfully completed during the previous execution of the CSO are fulfilled by retrieving the historical processing data; and
directing commands corresponding to the uncompleted part of the CSO to actual Network Elements.

23. A computer program product stored on a non-transitory computer readable medium and comprising program instructions that, when executed by one or more processing circuits associated with a provisioning system, cause the provisioning system to resume a failed Customer Service Order (CSO) for provisioning one or more Network Elements, the computer program instructions causing the provisioning system to:
call a provisioning logic for re-executing the failed CSO, the failed CSO comprising a successfully completed part and an uncompleted part, the successfully completed part corresponding to commands successfully completed during a previous execution of the failed CSO, the uncompleted part corresponding to commands not successfully completed during the previous execution of the failed CSO, the previous execution of the CSO causing generation of historical processing data, the re-executing comprising:
directing the successfully completed part of the failed CSO to a fake environment in which the commands successfully completed of the failed CSO are fulfilled by retrieving the historical processing data; and
directing commands corresponding to an uncompleted part of the failed CSO to actual Network Elements.

* * * * *

UNITED STATES PATENT AND TRADEMARK OFFICE
CERTIFICATE OF CORRECTION

| | | |
|---|---|---|
| PATENT NO. | : 8,914,335 B2 | Page 1 of 1 |
| APPLICATION NO. | : 13/129922 | |
| DATED | : December 16, 2014 | |
| INVENTOR(S) | : Li et al. | |

It is certified that error appears in the above-identified patent and that said Letters Patent is hereby corrected as shown below:

On the Title Page, in item (52), under "U.S. Cl.", in Column 1, Line 3, delete "711/181; 711/182" and insert -- 711/161; 711/162 --, therefor.

On the Title Page, in the figure, for Step "S8", in Line 2, delete "complet" and insert -- complete --, therefor.

In the Drawings:

In Fig. 2, Sheet 2 of 6, for Step "S8", in Line 2, delete "complet" and insert -- complete --, therefor.

In the Specification:

In Column 5, Line 16, delete "provisioning" and insert -- provisioning. --, therefor.

In Column 6, Line 24, delete "FIG." and insert -- FIGS. --, therefor.

In Column 6, Line 53, delete "step." and insert -- step --, therefor.

In Column 8, Line 57, delete "telephone" and insert -- telephone. --, therefor.

In Column 9, Line 45, delete "send" and insert -- sends --, therefor.

Signed and Sealed this
Twenty-eighth Day of July, 2015

Michelle K. Lee
*Director of the United States Patent and Trademark Office*